US007185863B2

(12) United States Patent
Sakaguchi

(10) Patent No.: US 7,185,863 B2
(45) Date of Patent: Mar. 6, 2007

(54) MOUNTINGS FOR TEMPERATURE CONTROL UNIT FOR VENDING MACHINES AND METHODS FOR ATTACHING AND DETACHING SUCH UNITS

(75) Inventor: Takeshi Sakaguchi, Isesaki (JP)

(73) Assignee: Sanden Corporation, Gunma (JP)

( * ) Notice: Subject to any disclaimer, the term of this patent is extended or adjusted under 35 U.S.C. 154(b) by 158 days.

(21) Appl. No.: 10/835,932

(22) Filed: Apr. 30, 2004

(65) Prior Publication Data

US 2004/0227052 A1 Nov. 18, 2004

(30) Foreign Application Priority Data

May 12, 2003 (JP) ............................ 2003-133409

(51) Int. Cl.
*F16M 11/24* (2006.01)

(52) U.S. Cl. .............................. 248/188.4; 248/188.2; 248/650; 248/657

(58) Field of Classification Search ............ 248/188.2, 248/657, 354.3, 188.4, 677, 678, 679, 652, 248/656, 650; 411/378, 389, 384
See application file for complete search history.

(56) References Cited

U.S. PATENT DOCUMENTS 1,794,798 A * 3/1931 Sarr .......................... 254/104
3,044,312 A * 7/1962 Hall et al. ................. 74/89.22
4,114,845 A * 9/1978 Weisenberger .............. 248/615
4,436,268 A * 3/1984 Schriever ................. 248/188.3
5,090,664 A * 2/1992 McCullough et al. ....... 254/104
6,116,565 A * 9/2000 Reinke et al. .............. 248/562
6,357,621 B1 * 3/2002 Guindulain Vidondo ..... 221/85
6,669,422 B1 * 12/2003 Sterle ......................... 411/384
6,702,246 B1 * 3/2004 Schriever .................... 248/656

FOREIGN PATENT DOCUMENTS

JP 3235196 10/1991

* cited by examiner

*Primary Examiner*—Amy J. Sterling
(74) *Attorney, Agent, or Firm*—Baker Botts, LLP

(57) ABSTRACT

Mountings for a temperature control unit for a vending machine are provided, wherein the interior of the vending machine is divided by a partition into a storage cabinet and a machinery compartment and in which the temperature control unit is inserted to and removed from the machinery compartment from a front side of the vending machine. The mounting includes a movable support means for supporting the temperature control unit movably in a vertical direction, and an operation means for actuating the movable support means only by an operation in the front side of the vending machine. Further, methods for attaching and detaching such units from said mountings are provided. The method for attaching and detaching the unit may be significantly facilitated, and an improved seal between the unit and the partition may be readily achieved.

16 Claims, 2 Drawing Sheets

MOUNTINGS FOR TEMPERATURE CONTROL UNIT FOR VENDING MACHINES AND METHODS FOR ATTACHING AND DETACHING SUCH UNITS

BACKGROUND OF THE INVENTION

1. Field of the Invention

The present invention relates to a mounting for an environmental control unit suitable for use in vending machines, and more specifically, to a mounting for a temperature control unit whereby a cooling unit or a heating unit, or both, may be readily attached and detached as operating conditions warrant from a front side of a vending machine. The present invention also relates to methods for attaching and detaching such units by such mountings.

2. Description of Related Art

In a vending machine dispensing goods, such as soft drinks, a temperature control unit for cooling or heating those goods often is provided at a lower portion of the vending machine. In particular, in a vending machine which is made in an uncomplicated configuration, such as to simplify maintenance, the interior of the vending machine frequently may be divided by a partition into an upper portion forming a storage cabinet for holding goods and a lower portion forming a machinery compartment, and a temperature control unit, which is constructed as a modular unit incorporating cooling or heating devices, or both, thereinto, may be provided in the machinery compartment, so that the unit may be attached or detached from the front side of the vending machine. Such a configuration is depicted in Japanese Patent Publication No. JP-A-3-235196.

Further, in order to facilitate the attachment and detachment of a cooling unit into and from the machinery compartment, respectively, a structure is known, in which a guide member for guiding the cooling unit as the unit is moved in the attaching or detaching direction, is provided. Such a configuration is depicted in Japanese Patent Application No. JP-A-2001-351162.

Nevertheless, when attaching or detaching the temperature control unit for maintenance or replacement or the like, many parts, such as fasteners; sealing members, such as gaskets; and other parts, often also must be attached or detached. For maintenance, in addition to the detachment of parts, a complicated reassembly procedure may be required depending on variations of the unit. Thus, for such operations, a time-consuming and complicated procedures requiring specialized experience and knowledge may be required.

Especially, when the interior of a vending machine is divided by a partition into a storage cabinet and a machinery compartment, and in which a temperature control unit incorporated by means of other parts is attached and detached, the nature and quality of the connection between the partition and the unit may be important to prevent heat loss from or heat leakage into the storage cabinet and in order to save energy in the operation of the unit. It is necessary to bring the unit and the partition into close contact with each other in order to ensure an adequate seal between these components. In vending machines, most of operations may be performed from the front side of the vending machine. Nevertheless, if any complicated operation within the machinery compartment is required, that operation may be extremely difficult or even impossible.

SUMMARY OF THE INVENTION

Accordingly, a need has arisen for a less complicated procedure for attaching and detaching an environmental control unit suitable for use in vending machines. Moreover, a need has arisen to provide a mounting for an environmental control unit suitable for use in vending machines which may facilitate the operations required for attaching the unit into a machinery compartment of a predetermined configuration and detaching the unit from the machinery compartment, when the unit is attached into and detached from the machine compartment from a front side of the vending machine. In particular, a need has arisen to provide a mounting which may facilitate the operation for moving the unit in a vertical direction, thereby improving access for maintenance and ensuring an adequate seal between the unit and a partition. Not only attaching the unit to and detaching the unit from the machinery compartment may be facilitated, but also operations for moving and adjusting the unit within the machinery compartment may be more readily accomplished.

In an embodiment of this invention, a mounting for an environmental control unit for a device, such as a vending machine, according to the present invention is provided. In the mounting, the interior of the vending machine is divided by a partition into an upper portion forming a storage cabinet, such as for storing goods, and a lower portion forming a machinery compartment for receiving the control unit. The control unit is inserted to and removed from the machinery compartment from a front side of the device. The mounting comprises a movable support means for supporting the control unit movably in a vertical orientation, and an operation means for actuating the movable support means by an operation in the front side of the vending machine.

In the mounting, the control unit may comprise a cooling unit, or may comprise a heating unit, or may be a unit capable of performing both functions. Further, the control unit preferably may comprise a modular unit in which devices for controlling a temperature in the storage cabinet are assembled integrally. For example, the control unit preferably may comprise a modular unit in which a set of devices, such as a refrigerator, heat exchangers for heat radiation and heat absorption, and fans for accelerating the heat exchange, are assembled, so that the functions of these devices may be handled integrally.

The movable support means further may comprise means for supporting at least one of a front end and a rear end of the control unit movably in a vertical direction. Of course, the movable support means may be constructed as means for supporting both the front and rear ends of the control unit movably in a vertical direction, simultaneously or independently by the operation means.

More specifically, for example, the movable support means may be configured, such that an angled surface is provided for engaging at least one of the front end and the rear end of the control unit. The control unit then may be moved in a vertical direction via engagement with the angled surface by a horizontal movement of the movable support means. In another embodiment, the movable support means may comprise an engaging portion for engaging at least one of the front end and the rear end of the temperature control unit, such that the temperature control unit is lifted or raised, e.g., moved in a vertical direction, via the engaging portion as the movable support means moves vertically.

Further, the movable support means may comprise a combination of the structures, e.g., the angled surface and the engaging portion, described above. For example, the movable support means may comprise the above-described angled surface at the rear end of the control unit and may comprise the above-described engaging portion at the front end of the control unit.

The operation means may be disposed on the front side of the device and may comprise a drive screw for actuating the movable support means. In such a configuration comprising the drive screw, for example, an operation force transmission means for transforming rotation of the drive screw into movement of the movable support means may be disposed between the drive screw and the movable support means. The operation force transmission means may comprise a cable, e.g., a wire, cord, or fiber, or a shaft or the like. Alternatively, the drive screw and the movable support means may be directly connected to each other. In this configuration, the movable support means may be moved vertically directly by rotating the drive screw. Further, the mounting may comprise a combination of the operation force transmission means and a structure directly connecting the drive screw with the movable support means.

In such a mounting for an environmental control unit for devices, such as vending machines, according to the present invention, the vertical movement of the control unit may be achieved solely by the operation of operation means provided on the front side of the vending machine after the control unit is inserted to the machinery compartment. Moreover, achieving the desired positional adjustment in the vertical direction may be readily accomplished. Therefore, when such an adjustment is performed, it may not be necessary to detach or attach many parts, such as fasteners and gaskets, and the operation may be significantly facilitated.

In still another embodiment, the invention is a mounting for an environmental control unit for a device, such as a vending machine. An interior compartment of the device comprises an upper chamber and a lower chamber for receiving the unit and a partition dividing the upper chamber from the lower chamber. The unit is adapted to be inserted to and removed from the lower chamber compartment from a front side of the device. The mounting comprises a base member; a two directional drive means disposed on a front end of the base member; a rear stay; and a transfer means. The two directional drive means may be a drive means, such as a drive screw or motor, that may be operated in two directions or a drive means comprising a transmission that may reverse the direction of the drive means's operation. The rear stay comprises a rear angled surface, and the stay is slidably disposed on the base member, such that the rear stay abuts a lower, rear edge of the unit. The transfer means is driven by the driving means and engages the rear stay, such that when the drive means is driven in a first direction the transfer means draws the rear stay toward the front end of the based member, and when the drive means is driven in a second direction the rear stay is driven away from the front end of the base member. Moreover, when the drive means is driven in the first direction, the unit is lifted toward the partition as the rear, lower edge of the unit rides up the rear angled surface; and when the drive means is driven in the second direction, the unit is lowered toward the base member as the rear, lower edge of the unit rides down the rear angled surface.

In yet another embodiment, the invention is a method for attaching and detaching an environmental control unit for a device, such as a vending machine. An interior compartment of the device comprises an upper chamber, a lower chamber for receiving the unit, and a partition dividing the upper chamber from the lower chamber. The unit is adapted to be inserted to and removed from the lower chamber compartment from a front side of the device. A mounting for the unit comprises a base member; a two directional drive means disposed on a front end of the base member; a rear stay; and a transfer means. The rear stay comprises a rear angled surface, and the rear stay is slidably disposed on the base member. The transfer means is driven by the driving means and engages the rear stay. The method comprises the steps of positioning the unit on the base, such that the rear stay abuts a lower, rear edge of the unit; and driving the drive means in a first direction, such that the transfer means draws the rear stay toward the front end of the based member, whereby the unit is lifted toward the partition as the rear, lower edge of the unit rides up the rear angled surface. The method further may comprise the step of driving the drive means in a second direction the rear stay is driven away from the front end of the base member; whereby the unit is lowered toward the base member as the rear, lower edge of the unit rides down the rear angled surface. In addition, the method may comprise the step of removing the unit from the lower chamber of the device.

Moreover, because the positional adjustment of the control unit in the vertical direction may be readily accomplished, desirable alignment and sealing properties of the control unit relative to the partition also may be achieved readily.

Consequently, operations, such as inspection, repair, and exchange, of the control unit and the respective parts thereof may be significantly facilitated, and the occurrence of problems, such as inadequate sealing ascribed to such operations may be reduced or eliminated, and a desirable and consistent performance may be maintained.

Other objects, features, and advantages of the present invention will be apparent to persons of ordinary skill in the art from the following detailed description of preferred embodiments of the present invention and the accompanying drawings.

BRIEF DESCRIPTION OF THE DRAWINGS

For a more complete understanding of the present invention, the needs satisfied thereby, and the objects, features, and advantages thereof, reference now is made to the following description taken in connection with the accompanying drawings.

DETAILED DESCRIPTION OF PREFERRED EMBODIMENTS

Figure 1:
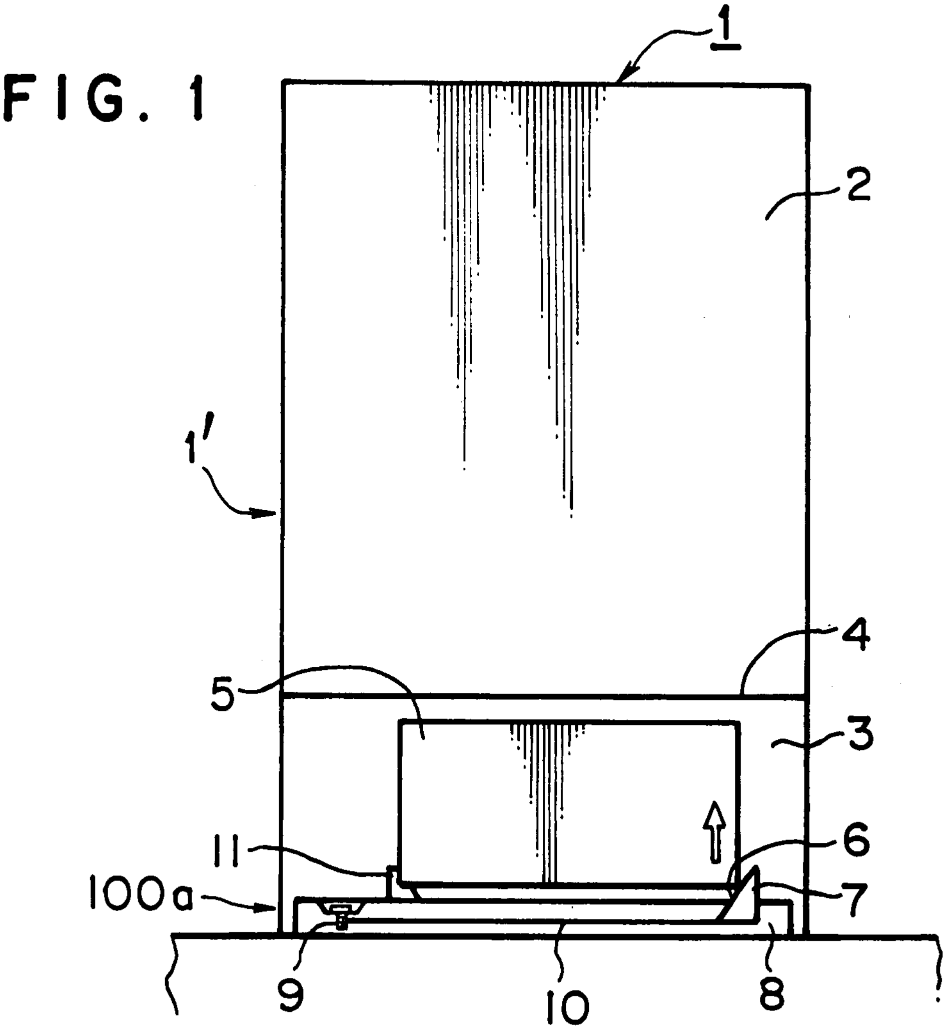
FIG. 1 is a cross-sectional view of a vending machine comprising for a temperature control unit according to an embodiment of the present invention.
Figure 2:
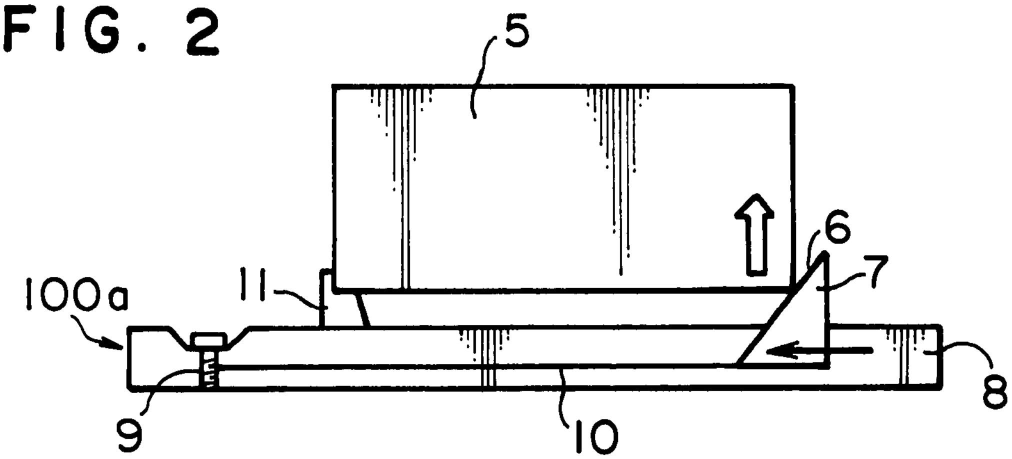
FIG. 2 is an partial, cross-sectional view of for a temperature control unit depicted in FIG. 1.

FIGS. 1 and 2 depict a mounting 100*a* for a temperature control unit for vending machines according to an embodiment of the present invention. In FIG. 1, a vending machine 1 has a storage cabinet 2 for storing goods to be dispensed at its upper portion, and a machinery compartment 3 containing a temperature control unit at its lower portion. Storage cabinet 2 and machinery compartment 3 are separated from each other by a partition 4. Openings (not shown) used for circulating cooled air or heated air are provided through partition 4. In this embodiment, the temperature control unit is constructed as a modular cooling unit 5 in which a plurality of devices, such as a refrigerator, heat exchangers for heat radiation and heat absorption, and fans for accelerating the heat exchange, are assembled, so that these devices may be operated integrally. Cooling unit 5 is mounted in machinery compartment 3 and may be removed from machine compartment 3 through a front side 1' of vending machine 1.

Cooling unit 5 is secured to mounting 100*a* for a temperature control unit for vending machines according to the present invention. In this embodiment, as further depicted in FIG. 2, a movable support means, such as a stay 7, comprises an angled surface 6 which engages a rear end of cooling unit 5, is provided on the rear side of cooling unit 5. Stay 7 supports cooling unit 5 movably in a vertical direction. Stay 7 further is mounted on a base member 8, but is movable in a horizontal direction, and by this horizontal movement, stay 7 moves cooling unit 5 in a vertical direction by engagement with angled surface 6.

On front side 1' of vending machine 1 at a front side of base member 8, a drive screw 9 is disposed as a drive means capable of moving stay 7 in a horizontal direction. Drive screw 9 is connected to stay 7 via cable 10. By rotating drive screw 9 in one direction, screw 9 engages cable 10 and draws stay 7 toward the front side. As described above, the rear end of cooling unit 5 is moved and lifted or raised by engagement with angled surface 6. In order to lower the rear end of cooling unit 5 is lowered, drive screw 9 is rotated in an opposite direction. Stay 7 connected by cable 10 is moved gradually rearward due to the weight of cooling unit 5, and the rear end of cooling unit 5 is lowered by engagement with angled surface 6.

The front end of cooling unit 5 is supported by a stay 11 having a predetermined size, which is inserted from front side 1'. Stay 11 may be fixed to base member 8 by an appropriate means.

In mounting 100*a* of cooling unit 5 constructed according to this embodiment, after cooling unit 5 is inserted to machinery compartment 3, stay 11 is fixed at a front side portion of cooling unit 5, and the side of the front end of cooling unit 5 thus is secured. Next, by rotating drive screw 9, cable 10 is wound around drive screw 9, and stay 7 connected to cable 10 is drawn towards front side 1' in a horizontal direction. Because stay 7 has angled surface 6, and because the angled surface 6 engages the rear end corner of cooling unit 5, the rear end of cooling unit 5 is lifted or raised with the drawing of stay 7 by cable 10 and drive screw 9. This movement is continued until cooling unit 5 comes into close contact with partition 4, and a seal is formed between cooling unit 5 and partition 4 by a proper adjustment of the horizontal movement of stay 7 and the vertical movement of cooling unit 5. When cooling unit 5 is removed, drive screw 9 may be rotated in an opposite direction to release the seal and remove the close contact between cooling unit 5 and partition 4, and cooling unit 5 then may be pulled toward front side 1' after removing stay 11.

Because the above-described operation accomplishing the lifting or raising, i.e., vertical movement, of cooling unit 5 may be carried out substantially by merely rotating drive screw 9 provided on front side 1' of vending machine 1, the operation may be performed by an uncomplicated procedure, and the operation may be significantly simplified as compared with the operation in the known structures. Even when vending machine 1 is placed in a narrow space, because only the operation on front side 1' thereof is employed, operations may be significantly facilitated. Therefore, an improved maintenance capability may be achieved, and an improved seal between cooling unit 5 and partition 4 may be ensured, thereby maintaining stable performance.

Figure 3:
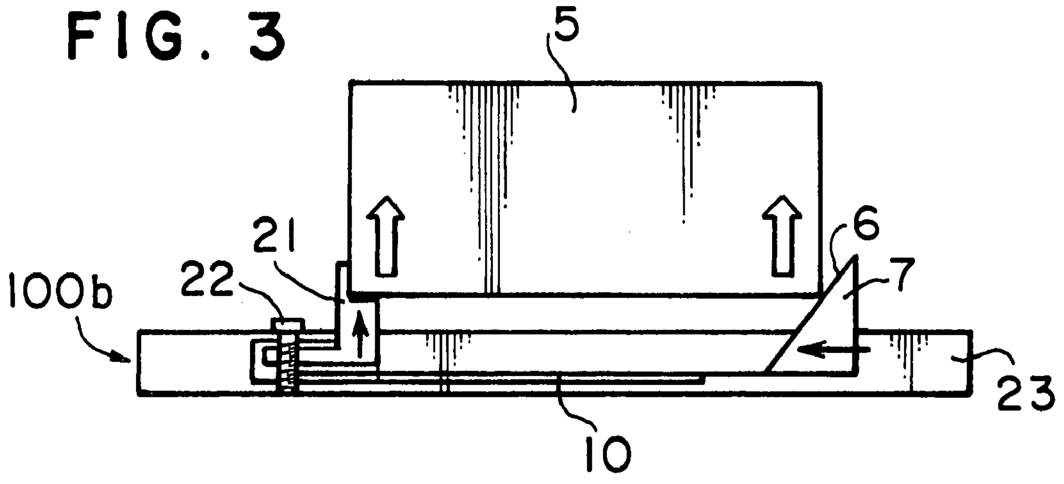
FIG. 3 is a partial, cross-sectional view of a mounting of a temperature control unit for vending machines according to another embodiment of the present invention.

FIG. 3 depicts a mounting 100*b* for a temperature control unit for vending machines according to another embodiment of the present invention. In this embodiment, although substantially the same structure as that shown in FIG. 2 is employed for the vertical movement of the rear end of cooling unit 5, a structure capable of vertical movement also is employed for the front end of cooling unit 5. In particular, a movable support means for supporting the front end of cooling unit 5 and for moving the front end of cooling unit 5 in a vertical direction is depicted. A stay 21 is provided, and the lower portion of stay 21 comprises a threaded bore which is threaded directly onto a threaded portion of a drive screw 22 provided as a drive means. Accompanying the rotational movement of drive screw 22, stay 21 moves relative to a base member 23. Stay 7 with angled surface 6, which is provided at the rear end of cooling unit 5, is connected to drive screw 22 via cable 10, similar to the structure depicted in FIG. 2.

In this embodiment, by rotating drive screw 22 in a first direction, cable 10 is wound around drive screw 22, stay 7 connected to cable 10 is drawn towards front side 1' in a horizontal direction, and the rear end of cooling unit 5 is lifted or raised. At the same time, stay 21 which is directly threaded onto drive screw 22 and is lifted or raised, and the front end of cooling unit 5 also is lifted or raised. Therefore, cooling unit 5 is lifted or raised by stays 7 and 21 while its front and rear ends are maintained at a desirable horizontal alignment, cooling unit 5 may be brought into close contact with partition 4, and by appropriate adjustment of the vertical movement, an improved seal may be formed between cooling unit 5 and partition 4. Stay 21 is preferably configured, such that the upper portion thereof may be overcome as needed, so that it does not interfere with cooling unit 5 when the cooling unit 5 is inserted to and removed from machine compartment 3.

Figure 4:
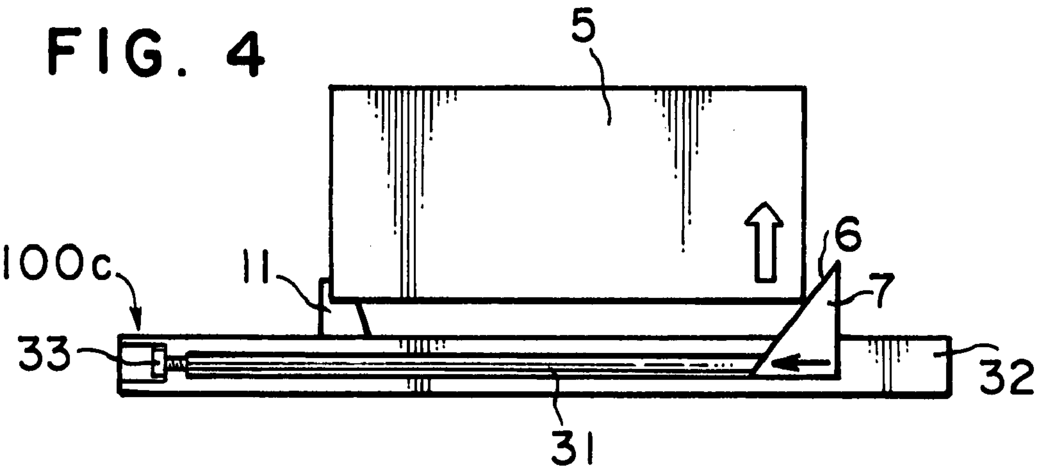
FIG. 4 is a partial, cross-sectional view of a mounting for a temperature control unit for vending machines according to a further embodiment of the present invention.

FIG. 4 depicts a mounting 100*c* for a temperature control unit for vending machines according to a further embodiment of the present invention. In this embodiment, as compared with the structure depicted in FIG. 2, a connection shaft 31, instead of cable 10, is used to transmit an driving force to stay 7. Stay 7 with angled surface 6 is provided proximate to the rear end of cooling unit 5. Connection shaft 31 connects stay 7 with a drive screw 33 provided on the front end portion of base member 31 as a driving means. Accompanying the rotation of drive screw 33, stay 7 is moved in a horizontal direction by connection shaft 31. Specifically, by rotating drive screw 33, connection shaft 31 comprising a threaded bore with drive screw 33 threaded thereto is moved toward the front side in a horizontal direction, and stay 7 is drawn towards front side 1' in a horizontal direction accompanying the movement of connection shaft 31. As a result, the rear end of cooling unit 5 is lifted or raised by engagement with angled surface 6. In addition, in such a mounting, substantially the same operation and advantages as those described with respect to and depicted in FIG. 2 may be achieved.

Figure 5:
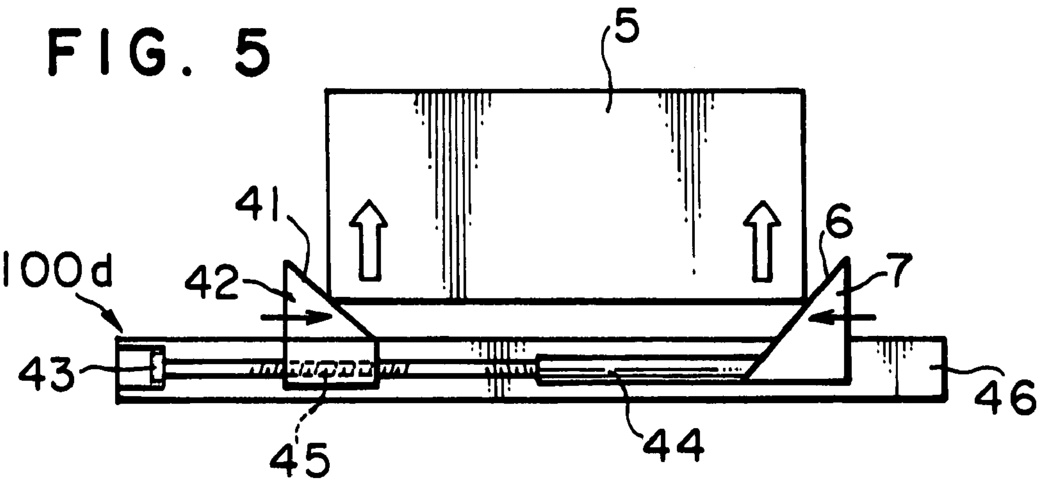
FIG. 5 is a partial, cross-sectional view of a mounting for a temperature control unit for vending machines according to still a further embodiment of the present invention.

FIG. 5 depicts a mounting 100*d* for a temperature control unit for vending machines according to a still further embodiment of the present invention. In this embodiment, as compared with the structure depicted in FIG. 4, a stay 42 having an angled surface 41 is provided as a movable support means for the front end of cooling unit 5. A drive screw 43, which is provided as drive means capable of being operated from the front end side of a base member 46, extends longer than that in the structure depicted in FIG. 4, and is threaded to a connection shaft 43 connected to stay 7. An intermediate threaded portion of drive screw 43 is formed as a reverse threaded portion 45, and reverse threaded portion 45 is threaded through a threaded bore formed through stay 42. Therefore, when drive screw 43 is rotated in a first direction, connection shaft 44 is drawn towards front side 1' in a horizontal direction, and stay 7 is drawn towards front side 1' in a horizontal direction. Consequently, the rear end of cooling unit 5 is lifted or raised by engagement with angled surface 6 of stay 7, and at the same time, stay 42 is moved in an opposite horizontal direction via reverse threaded portion 45. The front end of cooling unit 5 thus is lifted and raised by engagement with angled surface 41 of stay 42. As a result, cooling unit 5 may be lifted and raised while its front and rear ends are maintained at a condition of a horizontal alignment, and cooling unit 5 may be brought into close contact with partition 4. By performing appropriate adjustment of the movement in the vertical direction, an improved seal is formed between cooling unit 5 and partition 4.

Although the above-described embodiments have been explained as a mounting of cooling unit 5, the present invention may be applied to a mounting of a unit having a heating function or a unit having both cooling and heating functions.

While the invention has been described in connection with preferred embodiments, it will be understood by those skilled in the art that variations and modifications of the preferred embodiments described above may be made without departing from the scope of the invention. Other embodiments will be apparent to those skilled in the art from a consideration of the specification or from a practice of the invention disclosed herein or both. It is intended that the specification and the described examples are considered exemplary only, with the true scope of the invention indicated by the following claims.

What is claimed is:

1. A mounting for a control unit for a device, wherein the interior of said device comprises an upper part forming a storage cabinet and a lower part forming a machinery compartment for installing said control unit and a partition dividing said upper part from said lower part, said control unit adapted to be inserted to and removed from said machinery compartment from a front side of said device, said mounting comprising:

said control unit comprising a front end and a rear end, a movable support means for supporting said control unit movably in a vertical direction; and a drive means disposed in the front side of said device for actuating said movable support means; wherein said movable support means comprises means for supporting at least one of a front end and a rear end of said control unit movably in a vertical direction, and wherein said movable support means comprises an angled surface which abuts at least one of said front end and said rear end of said control unit and said control unit is moved in a vertical direction by abutment with said angled surface and by a horizontal movement of said movable support means, wherein said vertical direction is substantially perpendicular to said horizontal movement.

2. The mounting of claim 1, wherein said control unit comprises a cooling unit.

3. The mounting of claim 1, wherein said control unit comprises a modular unit in which devices for controlling a temperature in said storage cabinet are assembled integrally.

4. The mounting of claim 1, wherein said movable support means comprises an engaging portion which is configured to engage at least one of the front end and the rear end of said control unit and said control unit is moved in a vertical direction by said engaging portion due to a vertical movement of said movable support means.

5. The mounting of claim 1, wherein said operation means is disposed in the front side of said vending machine, and said operation means comprises a drive screw for actuating said movable support means.

6. The mounting of claim 5, wherein an operation force transmission means for transforming the turning of said drive screw into the vertical movement of said movable support means is disposed between said drive screw and said movable support means.

7. The mounting of claim 5, wherein said drive screw and said movable support means are directly connected to each other.

8. The mounting of claim 1, wherein said device is a vending machine.

9. A mounting for an environmental control unit wherein an interior compartment of said device comprises an upper chamber and a lower chamber for receiving said unit and a partition dividing said upper chamber from said lower chamber, said control unit adapted to be inserted to and removed from said lower chamber compartment from a front side of said device, said mounting comprising:

said control unit comprising a lower, rear edge;

a base member;

a two directional drive means disposed on a front end of said base member;

a rear stay comprising a rear angled surface, said stay being slidably disposed on said base member, such that said rear stay abuts said lower, rear edge of said unit; and a transfer means driven by said driving means and engaging said rear stay, such that when said drive means is driven in a first direction said transfer means draws said rear stay toward said front end of said base member and when said drive means is driven in a second direction said rear stay is driven away from said front end of said base member;

wherein when said drive means is driven in said first direction, said control unit is lifted toward said partition as said rear, lower edge of said unit rides up said rear angled surface; and when said drive means is driven in said second direction, said unit is lowered toward said base member as said lower, rear edge of said unit rides down said rear angled surface, wherein each of said first direction and said second direction is substantially perpendicular to a direction of control unit movement.

10. The mounting of claim 9, wherein said two directional drive means is a drive screw and said transfer means is a cable engaging said drive screw, such that when said drive screw is rotated in said first direction said cable is wound around said drive screw and when said drive screw is rotated in said second direction said cable is unwound from said drive screw.

11. The mounting of claim 10, further comprising a front stay disposed on said base member and engaging a lower, front edge of said unit, wherein said front stay has a threaded bore formed therethrough and is threaded unto said drive screw, such that when said drive screw is driven in a first direction said front stay lifts said lower, front edge of said unit toward said partition and when said drive screw is driven in said second direction said lower, front edge of said unit is lowered toward said base member.

12. The mounting of claim 9, wherein said two directional drive means is a drive screw and said transfer means is a shaft having a threaded bore formed therethrough and is threaded onto said drive screw, such that when said drive screw is rotated in said first direction said shaft is drawn toward said front end of said base member and when said drive screw is rotated in said second direction said shaft is driven from said front end of said base member.

13. The mounting of claim 12, further comprising a front stay disposed on said base member and engaging a lower, front edge of said unit, wherein said front stay has a threaded bore formed therethrough and is threaded onto said drive screw, such that when said drive screw is driven in a first direction said front stay lifts said lower, front edge of said unit toward said partition and when said drive screw is driven in said second direction said lower, front edge of said unit is lowered toward said base member.

14. The mounting of claim 13, wherein said front stay further comprises a front angled surface, said front stay being slidably disposed on said base member, such that said front stay abuts said lower, front edge of said unit; and wherein when said drive screw is driven in said first direction said unit is lifted toward said partition as said front, lower edge of said unit rides up said front angled surface and when said drive screw is driven in said second direction said unit is lowered toward said base member as said front, lower edge of said unit rides down said front, angled surface.

15. The mounting of claim 9, further comprising a front stay disposed on said base member and engaging a lower, front edge of said unit, wherein said transfer means engages said front stay, such that when said drive means is driven in a first direction said front stay lifts said lower, front edge of said unit toward said partition and when said drive means is driven in said second direction said lower, front edge of said unit is lowered toward said base member.

16. A vending machine comprising an environmental control unit for said vending machine, a mounting for said control unit, and an interior compartment, said compartment comprising an upper chamber, a lower chamber for receiving an environmental said control unit, and a partition dividing said upper chamber from said lower chamber, said unit adapted to be inserted to and removed from said lower chamber compartment from a front side of said device, said control unit comprising a lower, rear edge and said mounting comprising:

a base member;

a two directional drive means disposed on a front end of said base member;

a rear stay comprising a rear angled surface, said stay being slidably disposed on said base member, such that said rear stay abuts said lower, rear edge of said unit; and a transfer means driven by said driving means and engaging said rear stay, such that when said drive means is driven in a first direction said transfer means draws said rear stay toward said front end of said base member and when said drive means is driven in a second direction said rear stay is driven away from said front end of said base member;

wherein when said drive means is driven in said first direction, said control unit is lifted toward said partition as said rear, lower edge of said unit rides up said rear angled surface; and when said drive means is driven in said second direction, said unit is lowered toward said base member as said lower, rear edge of said unit rides down said rear angled surface, wherein said first direction and said second direction are substantially perpendicular to a direction of control unit movement.

* * * * *